United States Patent
Vadivelu et al.

(10) Patent No.: US 10,007,589 B2
(45) Date of Patent: Jun. 26, 2018

(54) SYSTEM AND METHOD FOR UNIVERSAL SERIAL BUS (USB) PROTOCOL DEBUGGING

(71) Applicant: Intel Corporation, Santa Clara, CA (US)

(72) Inventors: Karthi R. Vadivelu, Folsom, CA (US); Raul Gutierrez, Folsom, CA (US); Joseph A. Bennett, Roseville, CA (US)

(73) Assignee: Intel Corporation, Santa Clara, CA (US)

( * ) Notice: Subject to any disclaimer, the term of this patent is extended or adjusted under 35 U.S.C. 154(b) by 88 days.

(21) Appl. No.: 14/865,266

(22) Filed: Sep. 25, 2015

(65) Prior Publication Data

US 2017/0091060 A1 Mar. 30, 2017

(51) Int. Cl.
*G06F 11/00* (2006.01)
*G06F 11/273* (2006.01)
*G06F 11/22* (2006.01)

(52) U.S. Cl.
CPC ........ *G06F 11/273* (2013.01); *G06F 11/2221* (2013.01)

(58) Field of Classification Search
CPC .......................... G06F 11/273; G06F 11/2221
USPC .......................... 714/43, 44, 45, 46, 47.1, 56
See application file for complete search history.

(56) References Cited

U.S. PATENT DOCUMENTS

| | | | | |
|---|---|---|---|---|
| 6,600,739 | B1 * | 7/2003 | Evans ................. | G06F 13/4022 370/362 |
| 6,959,350 | B1 * | 10/2005 | Luke .................... | G06F 13/385 710/104 |
| 7,433,990 | B2 * | 10/2008 | Wurzburg ............ | G06F 13/385 710/315 |
| 7,480,753 | B2 * | 1/2009 | Bohm ................. | G06F 13/4022 710/104 |
| 8,140,900 | B2 * | 3/2012 | Yang ................ | G01R 31/31713 714/27 |
| 8,352,644 | B2 * | 1/2013 | Malamant ............. | G06F 1/3203 710/16 |
| 2010/0180006 | A1 * | 7/2010 | Nourbakhsh ....... | G06F 13/1663 709/213 |
| 2011/0013624 | A1 * | 1/2011 | Lerzer ................. | G06F 13/4022 370/360 |

\* cited by examiner

*Primary Examiner* — Dieu Minh T Le
(74) *Attorney, Agent, or Firm* — Jaffery Watson Mendonsa & Hamilton LLC (57) ABSTRACT

In one embodiment an electronic device includes a processor and at least one universal serial bus (USB) subsystem comprising logic, at least partially including hardware logic, configured to detect a connection from a remote electronic device to a USB port of the electronic device, determine whether the USB port of the electronic device is to act as an upstream facing port or a downstream facing port, and in response to a determination that the USB port of the electronic device is to be configured as an upstream facing port, to implement a port mapping process to map the USB port to one of a device controller or a debug controller. Other embodiments may be described.

21 Claims, 10 Drawing Sheets

FIG. 1   Electronic Device 100

SYSTEM AND METHOD FOR UNIVERSAL SERIAL BUS (USB) PROTOCOL DEBUGGING

BACKGROUND

The subject matter described herein relates generally to the field of electronic devices and more particularly to a system and method for universal serial bus (USB) protocol debugging.

USB kernel debug capability is conventionally provided as a service of the host controller, and therefore is available only when a debug target connects to a remote electronic device as a downstream facing port (DFP). This requires a "host to host" connection, which is not possible with USB Type C connectors. Accordingly additional systems and techniques implement USB protocol debugging may find utility, e.g., in electronic devices which incorporate USB Type C connectors.

BRIEF DESCRIPTION OF THE DRAWINGS

The detailed description is described with reference to the accompanying figures.

DETAILED DESCRIPTION

Described herein are exemplary systems and methods to implement USB protocol debugging in electronic devices. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

As described above, systems and methods to provide USB protocol debugging may find utility. In one aspect the subject matter described herein addresses this issue by providing a USB debug controller that is separate from the USB host controller and a control flow that enables a debug target to disambiguate between a host that is connected as a debug host and therefore needs to be connected to the debug controller, and a host that is connecting as a standard host and therefore needs to be connected to a USB device controller. Further details are described below with reference to FIGS. 1-10.

Figure 1:
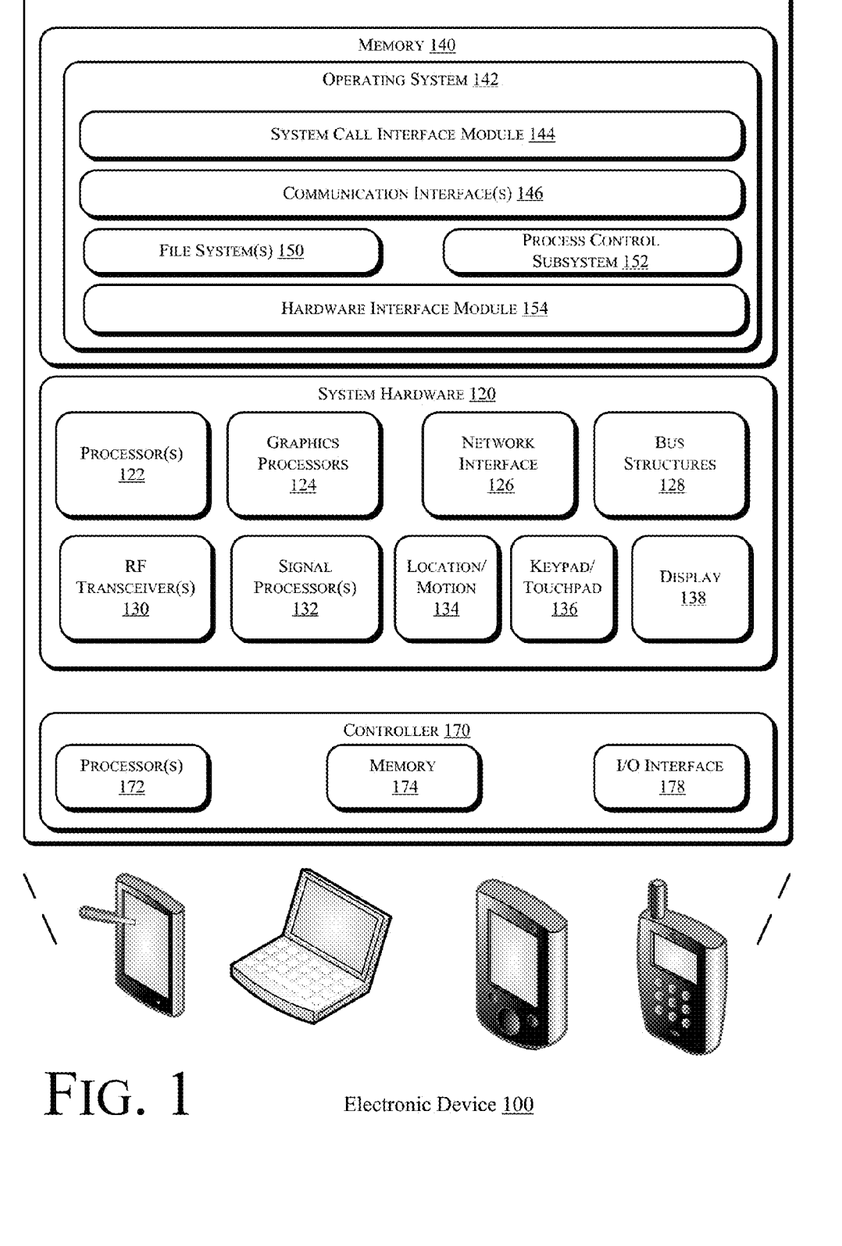
FIGS. 1-2 are schematic illustrations of exemplary electronic devices which may be adapted to implement USB protocol debugging in accordance with some embodiments.

FIG. 1 is a schematic illustration of an electronic device 100 which may be adapted to implement USB protocol debugging in accordance with some examples. In various examples, electronic device 100 may include or be coupled to one or more accompanying input/output devices including a display, one or more speakers, a keyboard, one or more other I/O device(s), a mouse, a camera, or the like. Other exemplary I/O device(s) may include a touch screen, a voice-activated input device, a track ball, a geolocation device, an accelerometer/gyroscope, biometric feature input devices, and any other device that allows the electronic device 100 to receive input from a user.

The electronic device 100 includes system hardware 120 and memory 140, which may be implemented as random access memory and/or read-only memory. A file store may be communicatively coupled to electronic device 100. The file store may be internal to electronic device 100 such as, e.g., eMMC, SSD, one or more hard drives, or other types of storage devices. Alternatively, the file store may also be external to electronic device 100 such as, e.g., one or more external hard drives, network attached storage, or a separate storage network.

System hardware 120 may include one or more processors 122, graphics processors 124, network interfaces 126, and bus structures 128. In one embodiment, processor 122 may be embodied as an Intel® Atom™ processors, Intel® Atom™ based System-on-a-Chip (SOC) or Intel® Core2 Duo® or i3/i5/i7 series processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 124 may function as adjunct processor that manages graphics and/or video operations. Graphics processor(s) 124 may be integrated onto the motherboard of electronic device 100 or may be coupled via an expansion slot on the motherboard or may be located on the same die or same package as the Processing Unit.

In one embodiment, network interface 126 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 128 connect various components of system hardware 128. In one embodiment, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI), a High Speed Synchronous Serial Interface (HSI), a Serial Low-power Inter-chip Media Bus (SLIMbus®), or the like.

Electronic device 100 may include an RF transceiver 130 to transceive RF signals, a Near Field Communication (NFC) radio 134, and a signal processing module 132 to process signals received by RF transceiver 130. RF transceiver may implement a local wireless connection via a protocol such as, e.g., Bluetooth or 802.11X. IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a WCDMA, LTE, general packet radio service (GPRS) interface (see, e.g., Guidelines on GPRS Handset Requirements, Global System for Mobile Communications/GSM Association, Ver. 3.0.1, December 2002).

Electronic device 100 may further include one or more location/motion devices 134 and input/output interfaces such as, e.g., a keypad 136 and a display 138. In some examples electronic device 100 may not have a keypad and may use the touch panel for input.

Memory 140 may include an operating system 142 for managing operations of electronic device 100. In one embodiment, operating system 142 includes a hardware interface module 154 that provides an interface to system hardware 120. In addition, operating system 140 may include a file system 150 that manages files used in the operation of electronic device 100 and a process control subsystem 152 that manages processes executing on electronic device 100.

Operating system 142 may include (or manage) one or more communication interfaces 146 that may operate in conjunction with system hardware 120 to transceive data packets and/or data streams from a remote source. Operating system 142 may further include a system call interface module 144 that provides an interface between the operating system 142 and one or more application modules resident in memory 130. Operating system 142 may be embodied as a UNIX operating system or any derivative thereof (e.g., Linux, Android, etc.) or as a Windows® brand operating system, or other operating systems.

In some examples an electronic device may include a controller 170, which may comprise one or more controllers that are separate from the primary execution environment. The separation may be physical in the sense that the controller may be implemented in controllers which are physically separate from the main processors. Alternatively, the trusted execution environment may be logical in the sense that the controller may be hosted on same chip or chipset that hosts the main processors.

By way of example, in some examples the controller 170 may be implemented as an independent integrated circuit located on the motherboard of the electronic device 100, e.g., as a dedicated processor block on the same SOC die. In other examples the trusted execution engine may be implemented on a portion of the processor(s) 122 that is segregated from the rest of the processor(s) using hardware enforced mechanisms.

In the embodiment depicted in FIG. 1 the controller 170 comprises a processor 172, a memory module 174, and an I/O interface 178. In some examples the memory module 174 may comprise a persistent flash memory module and the various functional modules may be implemented as logic instructions encoded in the persistent memory module, e.g., firmware or software. The I/O module 178 may comprise a serial I/O module or a parallel I/O module. Because the controller 170 is separate from the main processor(s) 122 and operating system 142, the controller 170 may be made secure, i.e., inaccessible to hackers who typically mount software attacks from the host processor 122.

Figure 2:
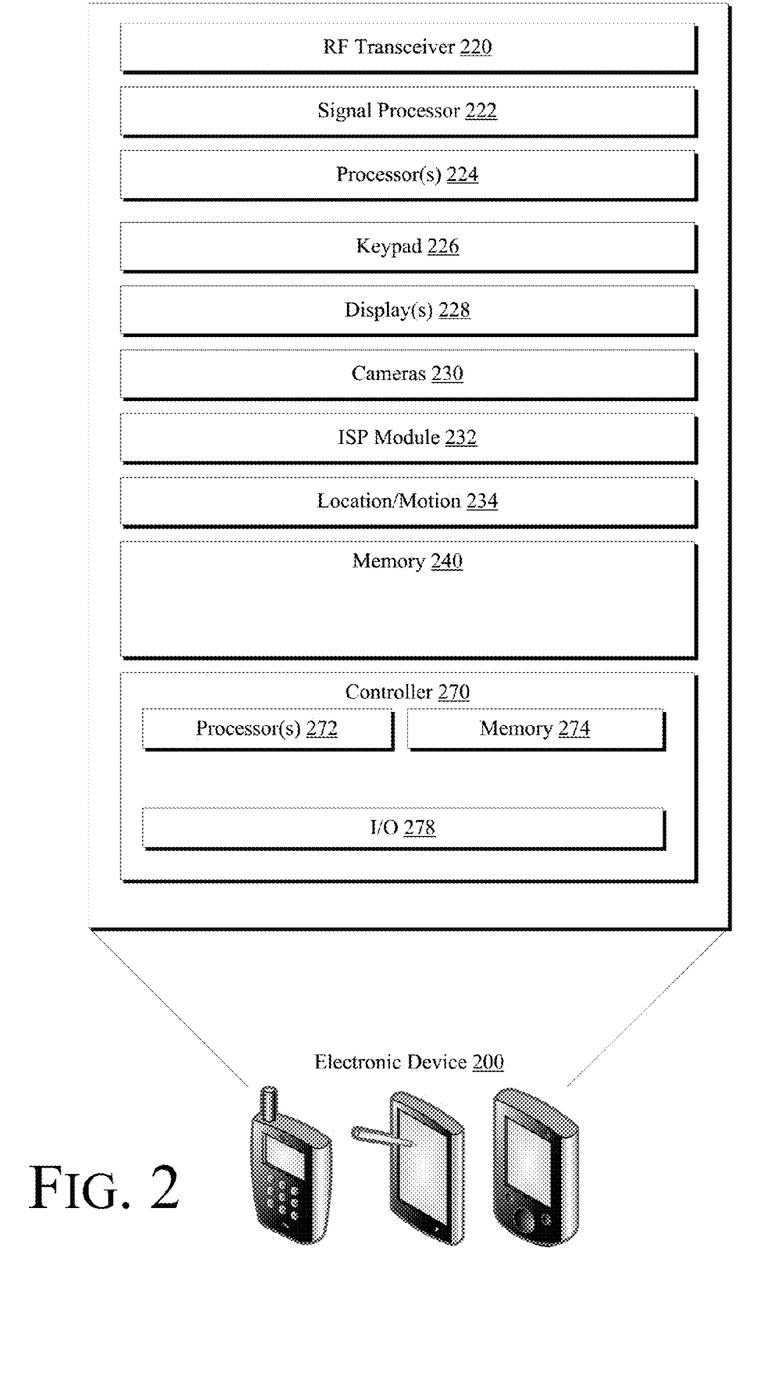

FIG. 2 is a schematic illustration of another embodiment of an electronic device 200 which may be adapted to implement USB protocol debugging, according to embodiments. In some embodiments electronic device 210 may be embodied as a mobile telephone, a personal digital assistant (PDA), a laptop computer, or the like. Electronic device 200 may include an RF transceiver 220 to transceive RF signals and a signal processing module 222 to process signals received by RF transceiver 220.

RF transceiver 220 may implement a local wireless connection via a protocol such as, e.g., Bluetooth or 802.11X. IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Electronic device 200 may further include one or more processors 224 and a memory module 240. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit. In some embodiments, processor 224 may be one or more processors in the family of Intel® PXA27x processors available from Intel® Corporation of Santa Clara, Calif. Alternatively, other CPUs may be used, such as Intel's Itanium®, XEON™, ATOM™, and Celeron® processors. Also, one or more processors from other manufactures may be utilized. Moreover, the processors may have a single or multi core design.

In some embodiments, memory module 240 includes random access memory (RAM); however, memory module 240 may be implemented using other memory types such as dynamic RAM (DRAM), synchronous DRAM (SDRAM), and the like. Memory 240 may comprise one or more applications which execute on the processor(s) 222.

Electronic device 210 may further include one or more input/output interfaces such as, e.g., a keypad 226 and one or more displays 228. In some embodiments electronic device 210 comprises one or more camera modules 230 and an image signal processor 232 and one or more location/motion devices 234.

In some embodiments electronic device 210 may include a controller 270 which may be implemented in a manner analogous to that of controller 170, described above. In the embodiment depicted in FIG. 2 the adjunct controller 270 comprises one or more processor(s) 272, a memory module 274, an I/O module 278. In some embodiments the memory module 274 may comprise a persistent flash memory module. The I/O module 278 may comprise a serial I/O module or a parallel I/O module. Again, because the adjunct controller 270 is physically separate from the main processor(s) 224, the adjunct controller 270 may be made secure, i.e., inaccessible to hackers such that it cannot be tampered with.

Figure 3:
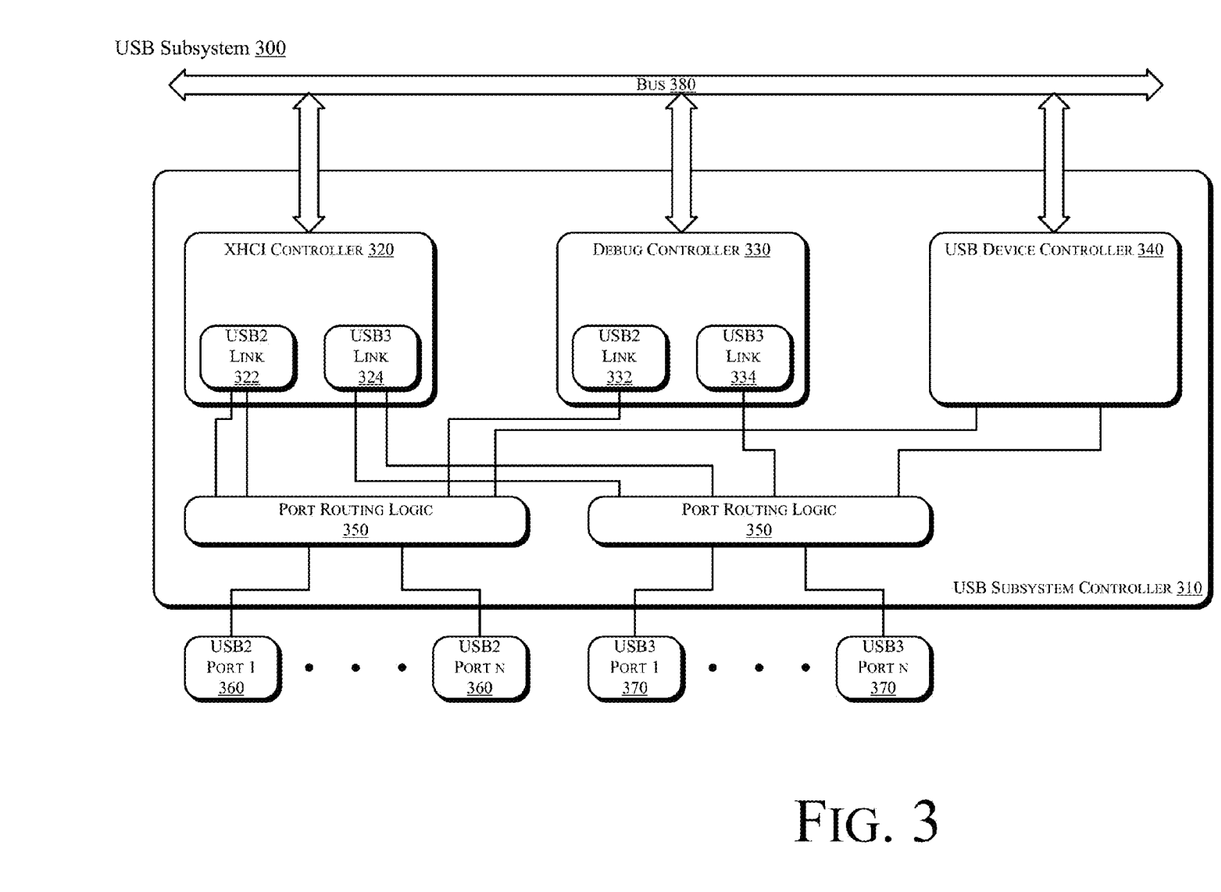
FIG. 3 is a high-level schematic illustration of an exemplary architecture for a USB subsystem which may be adapted to implement USB protocol debugging in accordance with some embodiments.

FIG. 3 is a high-level schematic illustration of an exemplary architecture for a USB subsystem 300 which may be adapted to implement USB protocol debugging in accordance with some embodiments. Referring to FIG. 3, in some examples the subsystem 300 comprises a USB subsystem controller 310. Subsystem controller 310 may be implemented as a processor as described herein, or may be implemented as field programmable gate array (FPGA) or as a dedicated device, e.g., an application specific integrated circuit (ASIC).

USB subsystem controller 310 may include logic defining one or more functional modules. In the example depicted in FIG. 3 the USB subsystem 310 includes logic which defines a host controller 320, a debug controller 330, a USB device controller 340 and port routing logic 350.

In some examples host controller 320 may implement an interface compatible with the extensible host controller interface (xHCI) interface specification defined in the Universal Serial Bus (USB) 3.X (www.usb.org). Host controller 320 may provide an interface to communication bus 380 which may allow data to be passed between host controller 320 and a host device, e.g., one or more processors in an electronic device such as device 100 or device 200. Host controller 320 may provide one or more USB 2.0 links 322 and one or more USB 3.0 links 324.

In some examples debug controller 330 may be implemented as a logical entity that is completely separate from host controller 320. Debug controller 330 may provide an interface to communication bus 380 which may allow data to be passed between debug controller 330 and a host device, e.g., one or more processors in an electronic device such as device 100 or device 200. Debug controller 330 may provide one or more USB 2.0 links 322 and one or more USB 3.0 links 324.

In some examples device controller 340 may be implemented as a logical entity that is completely separate from host controller 320 and debug controller 330. Device controller 340 may provide an interface to communication bus 380 which may allow data to be passed between device controller 340 and a host device, e.g., one or more processors in an electronic device such as device 100 or device 200.

The host controller 320, debug controller 330 and device controller 340 are coupled to port routing logic modules 350 which route communication between USB 2.0 ports 360 and USB 3.0 ports 370.

Figure 4:
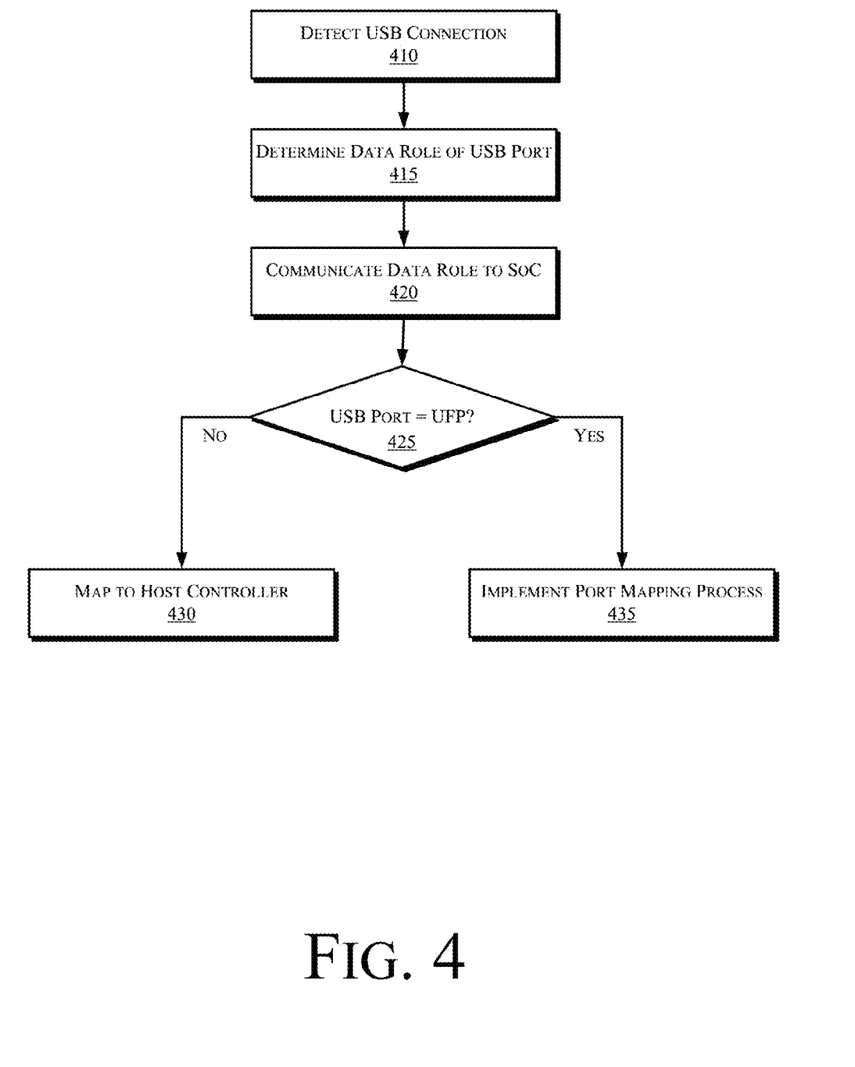
FIGS. 4-5 are flowcharts illustrating operations in methods to implement USB protocol debugging in accordance with some embodiments.

In some examples the USB subsystem controller 310 implements operations to implement USB protocol debugging. Referring to FIG. 4, at operation 410 the controller 310 detects a connection from a remote electronic device on one of the USB ports 360, 370. In some examples the connection may be detected by a power delivery logic in the USB subsystem controller 310.

At operation 415 the USB subsystem controller 310 determines a data role of the USB port 360, 370 on which the connection was detected. In some examples the USB subsystem controller 310 initiates a handshake process with a USB controller on the remote electronic device pursuant to which the devices can exchange their respective capabilities in order to configure their respective USB ports. In some examples configuration messages may be exchanged to share link capabilities and to agree upon a link configuration. Configuration messages may comprise one or more packets of data and can be structured in any suitable scheme, depending on a defined protocol. For example, USB3 uses a configuration message referred to as a Link Management Packet (LMP), which is defined in the USB 3.0 Bus Specification.

In some embodiments multiple configuration messages and/or negotiations may be used to share additional configuration information and agree upon additional link characteristics. For example, USB ports to be linked may negotiate configuration into one of several commonly available protocols, a different power mode, or the like.

As part of the link negotiation the USB subsystem controller 310 may determine whether the USB port of the electronic device is to act as an upstream facing port or a downstream facing port. At operation 420 the data role of the USB port (i.e., whether the USB port is to act as an upstream facing port or a downstream facing port) may be communicated to the USB subsystem controller 310.

If, at operation 425, the USB port which received the connection is not to be configured as an upstream facing port (i.e., if the port is to be configured as a downstream facing port) then control passes to operation 430 and the USB port is mapped to the host controller 320. By contrast, if at operation 425 the USB port which received the connection is to be configured as an upstream facing port then control passes to operation 435 and the a port mapping process is implemented to map the USB port to one of the device controller 340 or the debug controller 330.

Figure 5:
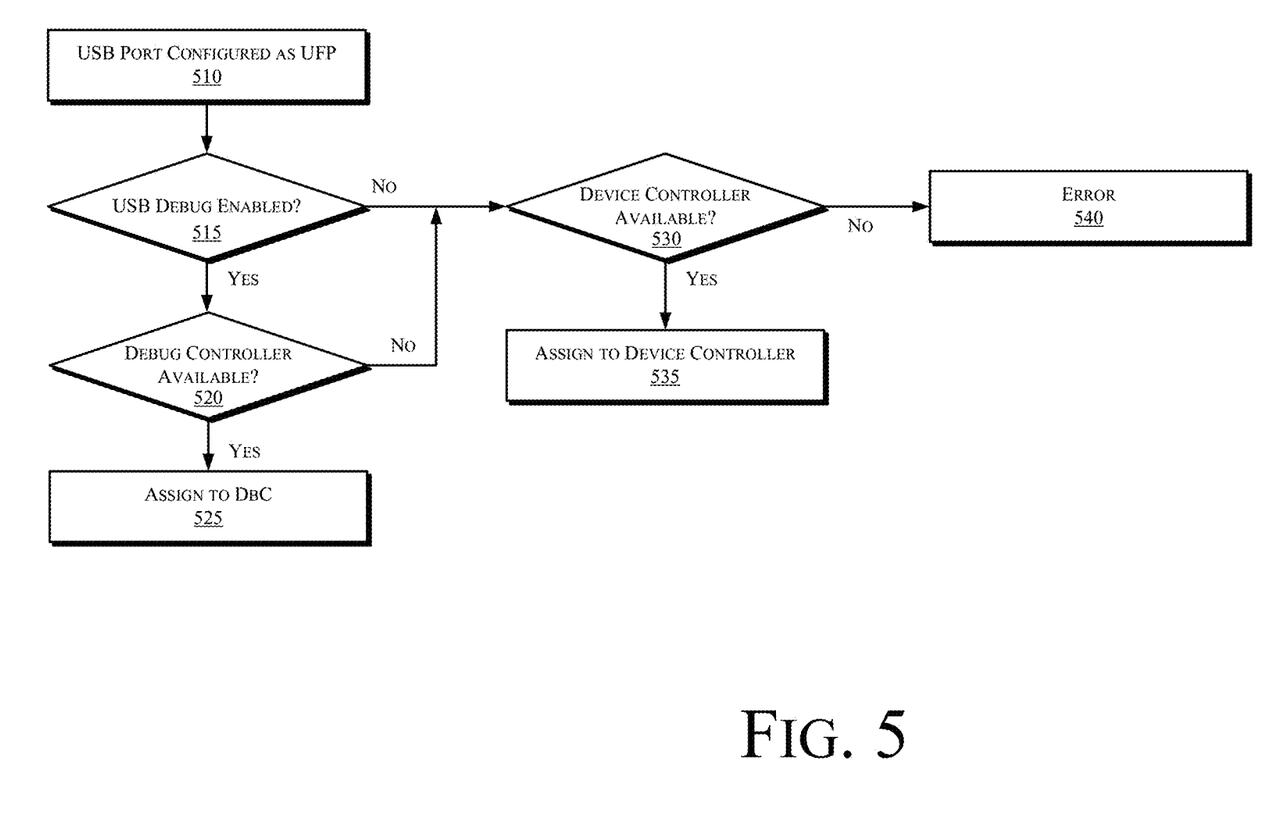

One example of a port mapping process is depicted in FIG. 5. Referring to FIG. 5, at operation 510 the USB port which received the request is configured as an upstream facing port. If, at operation 515 the electronic device in which the USB subsystem 300 is embedded has a USB debug feature enabled then control passes to operation 520. In some examples the USB debug feature for the electronic device may be enabled by setting a parameter in the basic input/output system (BIOS) of the electronic device. In such examples a query may be launched to the BIOS of the electronic device to retrieve the parameter from the BIOS for the electronic device.

If, at operation 520, the debug controller 330 is available for use then control passes to operation 525 then the connection is assigned to the debug controller 330 and the port routing logic 350 coupled to the USB port 360, 370 which received the connection routes the USB port 360, 370 to the debug controller 330. By contrast, if at operation 515 the debug controller is not enabled or at operation 520 the debug controller 330 is not available then control passes to operation 530.

If, at operation 530, the device controller 340 is available then control passes to operation 535 and the connection is assigned to the device controller 340 and the port routing logic 350 coupled to the USB port 360, 370 which received the connection routes the USB port 360, 370 to the device controller 340. By contrast, if at operation 530 the device controller 340 is not available then control passes to operation 540 and an error is generated.

Thus, the systems and methods described herein enable a USB subsystem 300 for an electronic device such as electronic device 100 or 200 to implement USB protocol debugging, even if the USB subsystem incorporates Type C connectors.

Figure 6:
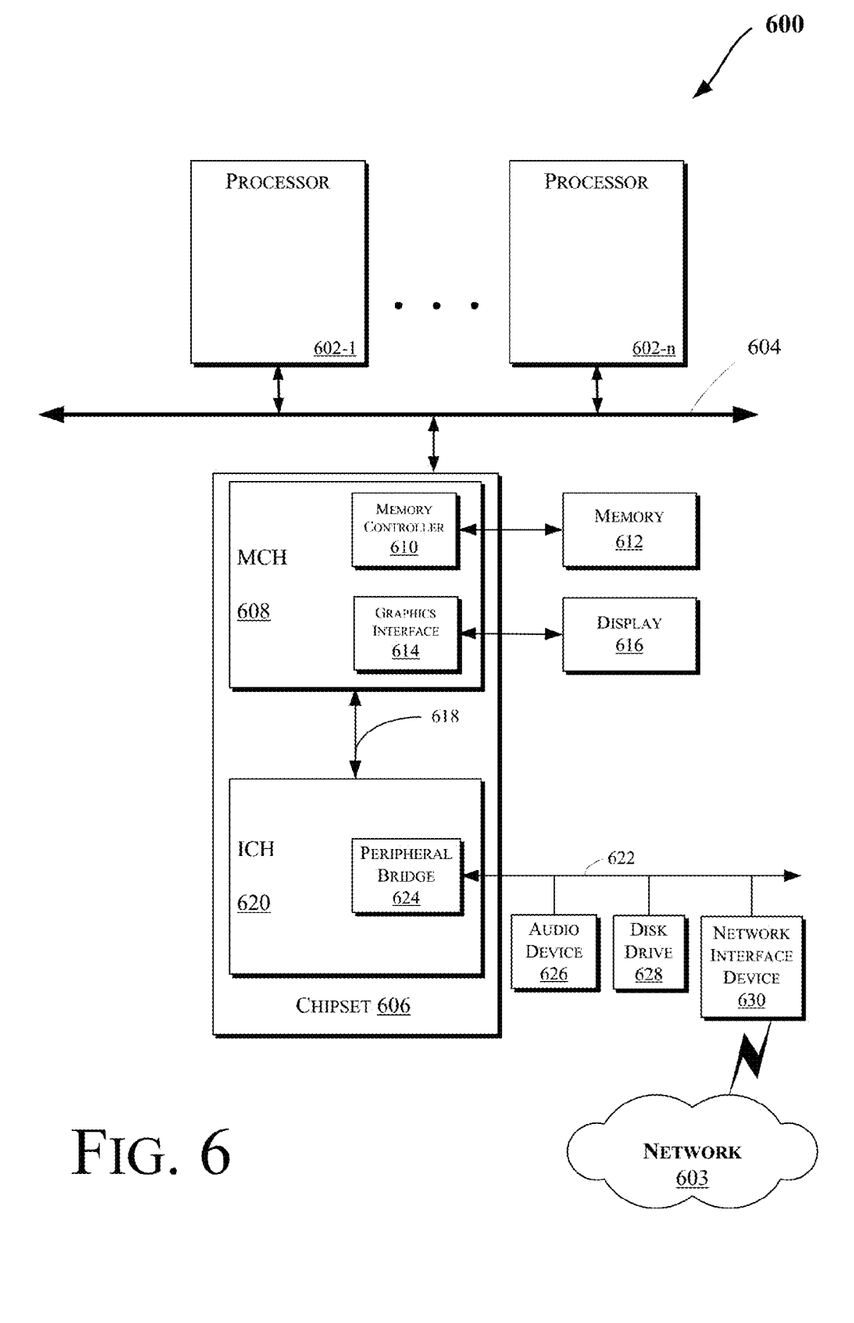
FIGS. 6-10 are schematic illustrations of electronic devices which may be adapted to implement USB protocol debugging in accordance with some embodiments.

As described above, in some embodiments the electronic device may be embodied as a computer system. FIG. 6 illustrates a block diagram of a computing system 600 in accordance with an embodiment of the invention. The computing system 600 may include one or more central processing unit(s) (CPUs) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)).

Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an embodiment, one or more of the processors 602 may be the same or similar to the processors 102 of FIG. 1. For example, one or more of the processors 602 may include the control unit 120 discussed with reference to FIGS. 1-3. Also, the operations discussed with reference to FIGS. 3-5 may be performed by one or more components of the system 600.

A chipset 606 may also communicate with the interconnection network 604. The chipset 606 may include a memory control hub (MCH) 608. The MCH 608 may include a memory controller 610 that communicates with a memory 612 (which may be the same or similar to the memory 130 of FIG. 1). The memory 412 may store data, including sequences of instructions, that may be executed by the CPU 602, or any other device included in the computing system 600. In one embodiment of the invention, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple CPUs and/or multiple system memories.

The MCH 608 may also include a graphics interface 614 that communicates with a display device 616. In one embodiment of the invention, the graphics interface 614 may communicate with the display device 616 via an accelerated graphics port (AGP). In an embodiment of the invention, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the CPU 602 and peripheral devices. Other types of topologies may be utilized. Also, multiple buses may communicate with the ICH 620, e.g., through multiple bridges or controllers. Moreover, other peripherals in communication with the ICH 620 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some embodiments of the invention. In addition, the processor 602 and one or more other components discussed herein may be combined to form a single chip (e.g., to provide a System on Chip (SOC)). Furthermore, the graphics accelerator 616 may be included within the MCH 608 in other embodiments of the invention.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
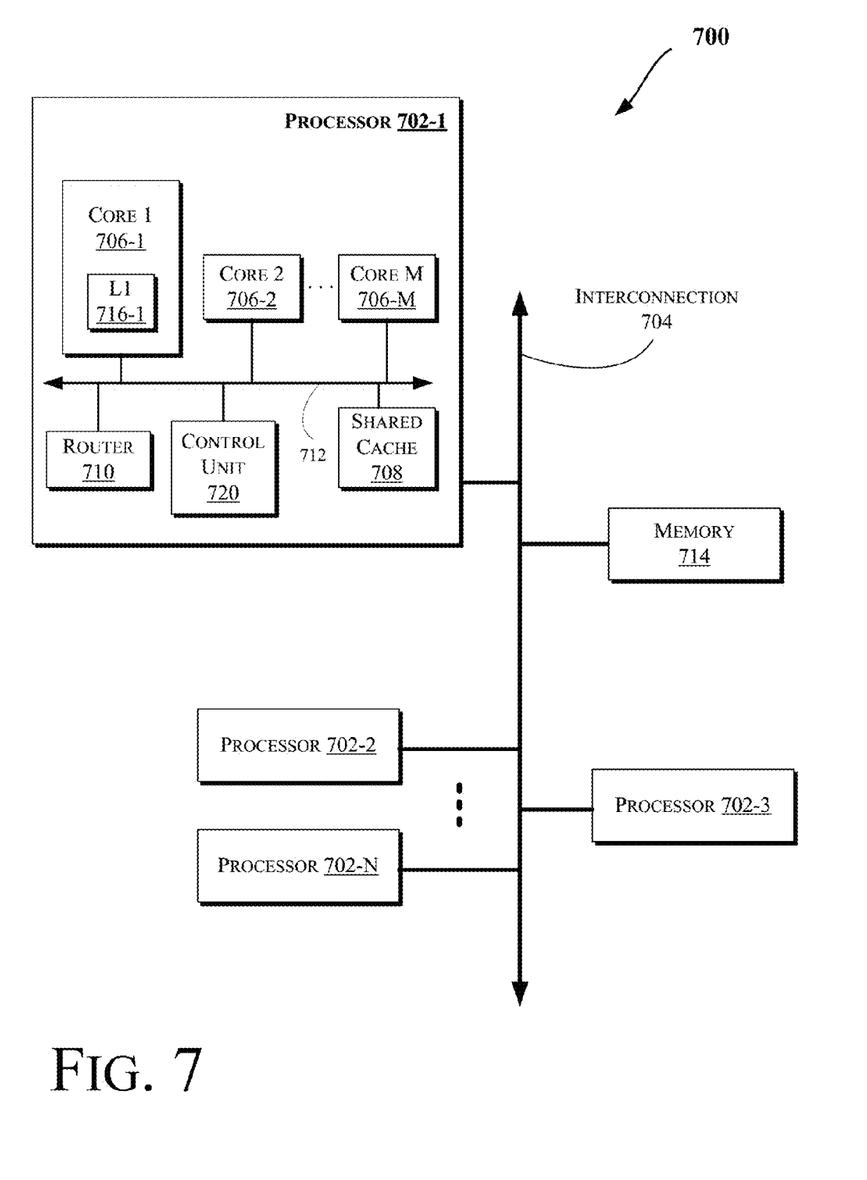

FIG. 7 illustrates a block diagram of a computing system 700, according to an embodiment of the invention. The system 700 may include one or more processors 702-1 through 702-N (generally referred to herein as "processors 702" or "processor 702"). The processors 702 may communicate via an interconnection network or bus 704. Each processor may include various components some of which are only discussed with reference to processor 702-1 for clarity. Accordingly, each of the remaining processors 702-2 through 702-N may include the same or similar components discussed with reference to the processor 702-1.

In an embodiment, the processor 702-1 may include one or more processor cores 706-1 through 706-M (referred to herein as "cores 706" or more generally as "core 706"), a shared cache 708, a router 710, and/or a processor control logic or unit 720. The processor cores 706 may be implemented on a single integrated circuit (IC) chip. Moreover, the chip may include one or more shared and/or private caches (such as cache 708), buses or interconnections (such as a bus or interconnection network 712), memory controllers, or other components.

In one embodiment, the router 710 may be used to communicate between various components of the processor 702-1 and/or system 700. Moreover, the processor 702-1 may include more than one router 710. Furthermore, the multitude of routers 710 may be in communication to enable data routing between various components inside or outside of the processor 702-1.

The shared cache 708 may store data (e.g., including instructions) that are utilized by one or more components of the processor 702-1, such as the cores 706. For example, the shared cache 708 may locally cache data stored in a memory 714 for faster access by components of the processor 702. In an embodiment, the cache 708 may include a mid-level cache (such as a level 2 (L2), a level 3 (L3), a level 4 (L4), or other levels of cache), a last level cache (LLC), and/or combinations thereof. Moreover, various components of the processor 702-1 may communicate with the shared cache 708 directly, through a bus (e.g., the bus 712), and/or a memory controller or hub. As shown in FIG. 7, in some embodiments, one or more of the cores 706 may include a level 1 (L1) cache 716-1 (generally referred to herein as "L1 cache 716").

Figure 8:
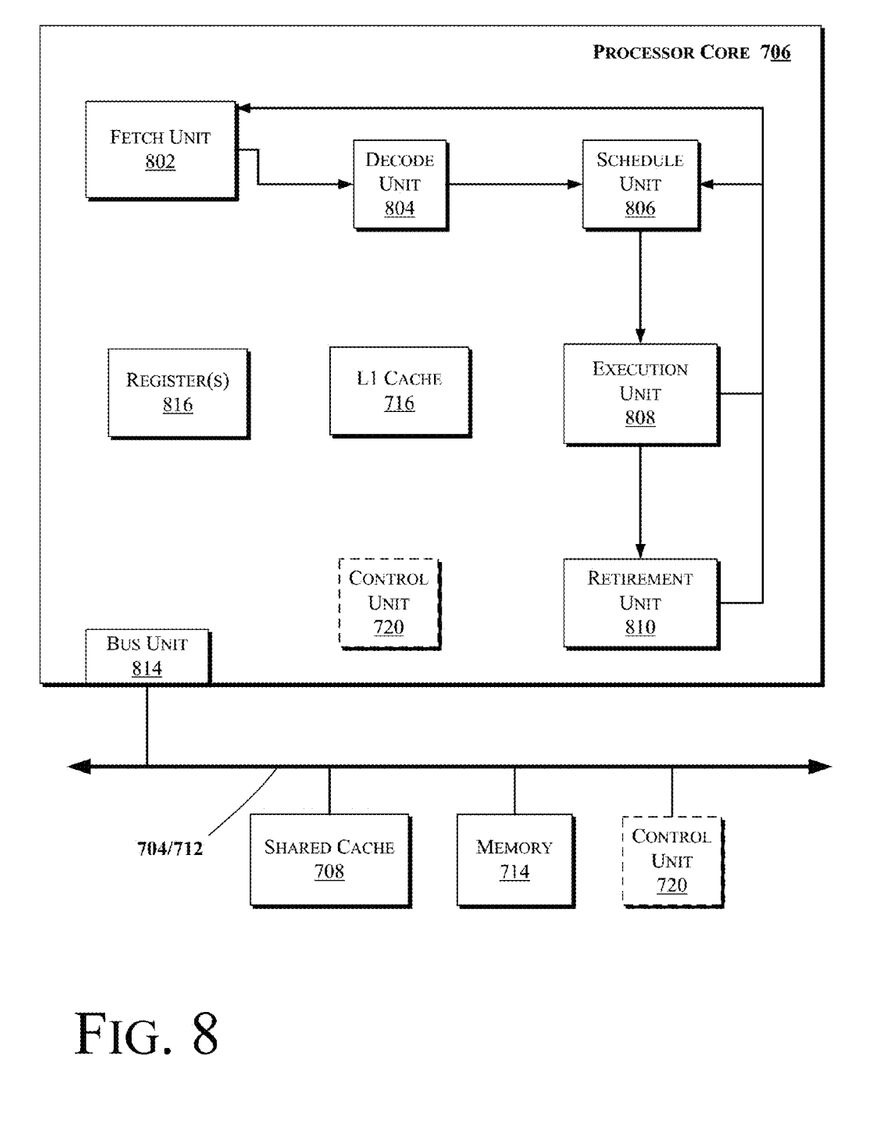

FIG. 8 illustrates a block diagram of portions of a processor core 706 and other components of a computing system, according to an embodiment of the invention. In one embodiment, the arrows shown in FIG. 8 illustrate the flow direction of instructions through the core 706. One or more processor cores (such as the processor core 706) may be implemented on a single integrated circuit chip (or die) such as discussed with reference to FIG. 7. Moreover, the chip may include one or more shared and/or private caches (e.g., cache 708 of FIG. 7), interconnections (e.g., interconnections 704 and/or 112 of FIG. 7), control units, memory controllers, or other components.

As illustrated in FIG. 8, the processor core 706 may include a fetch unit 802 to fetch instructions (including instructions with conditional branches) for execution by the core 706. The instructions may be fetched from any storage devices such as the memory 714. The core 706 may also include a decode unit 804 to decode the fetched instruction. For instance, the decode unit 804 may decode the fetched instruction into a plurality of uops (micro-operations).

Additionally, the core 706 may include a schedule unit 806. The schedule unit 806 may perform various operations associated with storing decoded instructions (e.g., received from the decode unit 804) until the instructions are ready for dispatch, e.g., until all source values of a decoded instruction become available. In one embodiment, the schedule unit 806 may schedule and/or issue (or dispatch) decoded instructions to an execution unit 808 for execution. The execution unit 808 may execute the dispatched instructions after they are decoded (e.g., by the decode unit 804) and dispatched (e.g., by the schedule unit 806). In an embodiment, the execution unit 808 may include more than one execution unit. The execution unit 808 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 808.

Further, the execution unit 808 may execute instructions out-of-order. Hence, the processor core 706 may be an out-of-order processor core in one embodiment. The core 706 may also include a retirement unit 810. The retirement unit 810 may retire executed instructions after they are committed. In an embodiment, retirement of the executed instructions may result in processor state being committed from the execution of the instructions, physical registers used by the instructions being de-allocated, etc.

The core 706 may also include a bus unit 714 to enable communication between components of the processor core 706 and other components (such as the components discussed with reference to FIG. 8) via one or more buses (e.g., buses 804 and/or 812). The core 706 may also include one or more registers 816 to store data accessed by various components of the core 706 (such as values related to power consumption state settings).

Furthermore, even though FIG. 7 illustrates the control unit 720 to be coupled to the core 706 via interconnect 812, in various embodiments the control unit 720 may be located elsewhere such as inside the core 706, coupled to the core via bus 704, etc.

Figure 9:
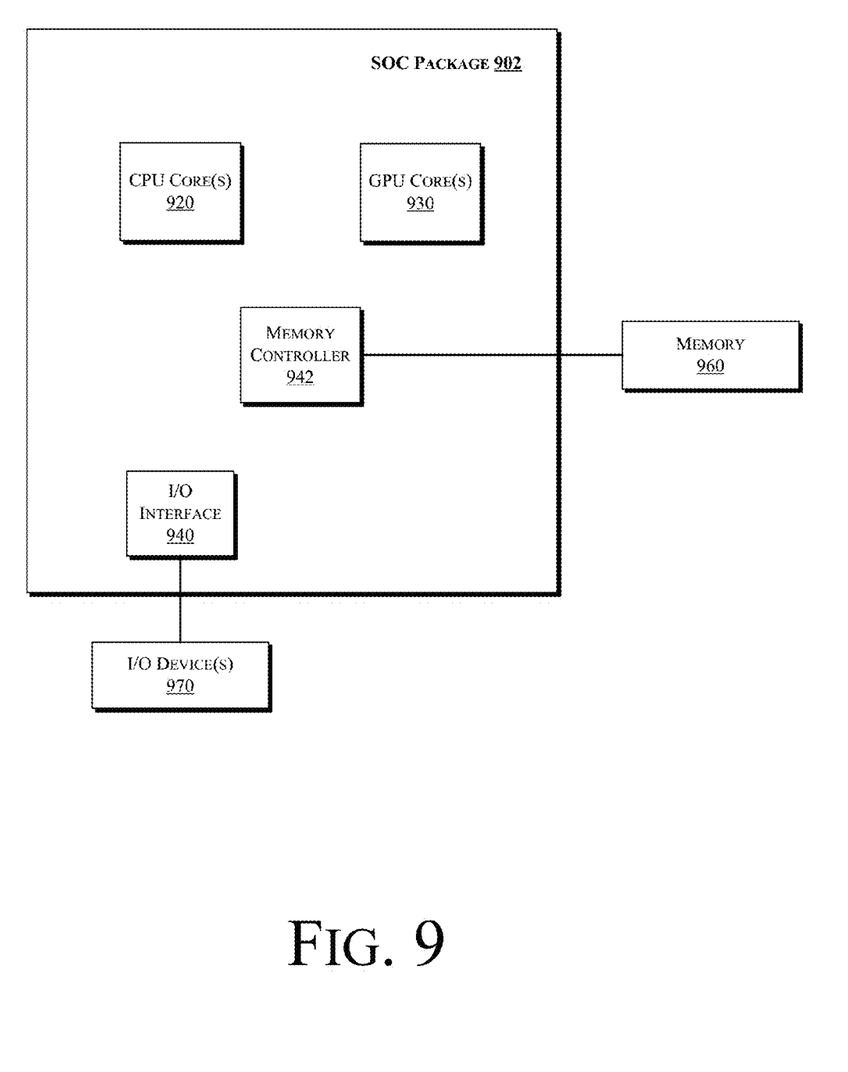

In some embodiments, one or more of the components discussed herein can be embodied as a System On Chip (SOC) device. FIG. 9 illustrates a block diagram of an SOC package in accordance with an embodiment. As illustrated in FIG. 9, SOC 902 includes one or more Central Processing Unit (CPU) cores 920, one or more Graphics Processor Unit (GPU) cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 902 may include one or more other components, e.g., as discussed with reference to the other figures herein. In one embodiment, SOC package 902 (and its components) is provided on one or more Integrated Circuit (IC) die, e.g., which are packaged into a single semiconductor device.

As illustrated in FIG. 9, SOC package 902 is coupled to a memory 960 (which may be similar to or the same as memory discussed herein with reference to the other figures) via the memory controller 942. In an embodiment, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device(s) 970 may include one or more of a keyboard, a mouse, a touchpad, a display, an image/video capture device (such as a camera or camcorder/video recorder), a touch screen, a speaker, or the like.

Figure 10:
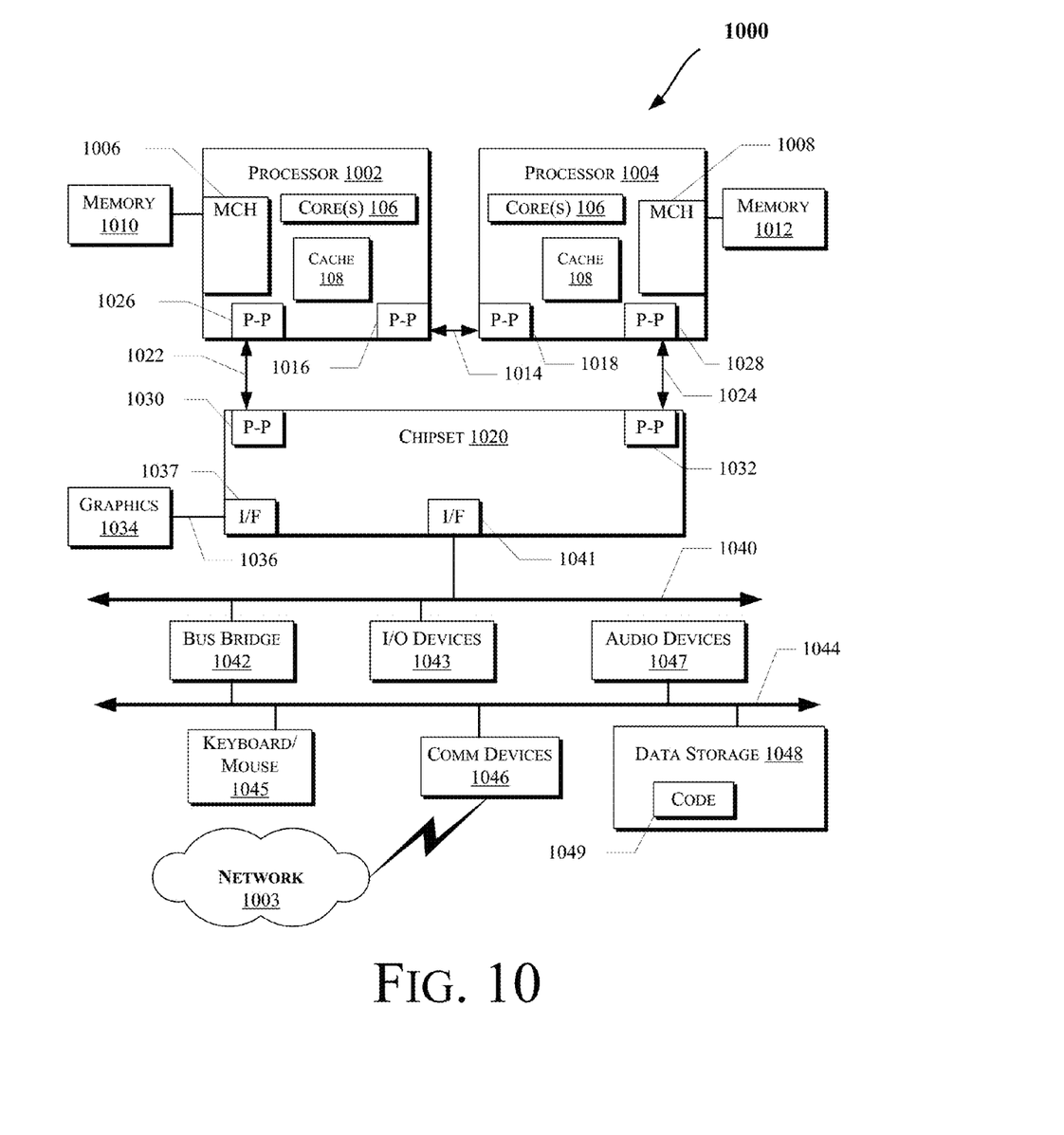

FIG. 10 illustrates a computing system 1000 that is arranged in a point-to-point (PtP) configuration, according to an embodiment of the invention. In particular, FIG. 10 shows a system where processors, memory, and input/output devices are interconnected by a number of point-to-point interfaces. As illustrated in FIG. 10, the system 1000 may include several processors, of which only two, processors 1002 and 1004 are shown for clarity. The processors 1002 and 1004 may each include a local memory controller hub (MCH) 1006 and 1008 to enable communication with memories 1010 and 1012.

In an embodiment, the processors 1002 and 1004 may be one of the processors 702 discussed with reference to FIG. 7. The processors 1002 and 1004 may exchange data via a point-to-point (PtP) interface 1014 using PtP interface circuits 1016 and 1018, respectively. Also, the processors 1002 and 1004 may each exchange data with a chipset 1020 via individual PtP interfaces 1022 and 1024 using point-to-point interface circuits 1026, 1028, 1030, and 1032. The chipset 1020 may further exchange data with a high-performance graphics circuit 1034 via a high-performance graphics interface 1036, e.g., using a PtP interface circuit 1037.

As shown in FIG. 10, one or more of the cores 106 and/or cache 108 of FIG. 1 may be located within the processors 1004. Other embodiments of the invention, however, may exist in other circuits, logic units, or devices within the system 1000 of FIG. 10. Furthermore, other embodiments of the invention may be distributed throughout several circuits, logic units, or devices illustrated in FIG. 10.

The chipset 1020 may communicate with a bus 1040 using a PtP interface circuit 1041. The bus 1040 may have one or more devices that communicate with it, such as a bus bridge 1042 and I/O devices 1043. Via a bus 1044, the bus bridge 1043 may communicate with other devices such as a keyboard/mouse 1045, communication devices 1046 (such as modems, network interface devices, or other communication devices that may communicate with the computer network 1003), audio I/O device, and/or a data storage device 1048. The data storage device 1048 (which may be a hard disk drive or a NAND flash based solid state drive) may store code 1049 that may be executed by the processors 1004.

The following examples pertain to further embodiments.

Example 1 is an electronic device comprising a processor and at least one universal serial bus (USB) subsystem comprising logic, at least partially including hardware logic, configured to detect a connection from a remote electronic device to a USB port of the electronic device, determine whether the USB port of the electronic device is to act as an upstream facing port or a downstream facing port, and in response to a determination that the USB port of the electronic device is to be configured as an upstream facing port, to implement a port mapping process to map the USB port to one of a device controller or a debug controller.

In Example 2, the subject matter of Example 1 can optionally include logic further configured to map the USB port of the electronic device to a host controller in response to a determination that the USB port of the electronic device is to be configured as a downstream facing port.

In Example 3, the subject matter of any one of Examples 1-2 can optionally include logic further configured to communicate a configuration status of the USB port of the electronic device to a controller of the USB subsystem.

In Example 4, the subject matter of any one of Examples 1-3 can optionally include logic further configured to determine whether a USB debug feature is enabled for the electronic device and in response to a determination that the USB debug controller is enabled and available, to assign the USB port to the USB debug controller.

In Example 5, the subject matter of any one of Examples 1-4 can optionally include logic further configured to query at least one parameter from a basic input/output system (BIOS) for the electronic device.

In Example 6, the subject matter of any one of Examples 1-5 can optionally include logic further configured to determine whether a USB debug feature is enabled for the electronic device and in response to a determination that the USB debug controller is not enabled and available, to determine whether a USB device function is available and in response to a determination that a USB device function is available, to assign the USB port to the USB device controller.

In Example 7, the subject matter of any one of Examples 1-6 can optionally include logic further configured to generate an error in response to a determination that a USB device function is not available.

Example 8 is a universal serial bus (USB) subsystem for use with an electronic device, the subsystem comprising at least one USB port and a controller comprising logic, at least partially including hardware logic, configured to detect a connection from a remote electronic device to a USB port of the electronic device, determine whether the USB port of the electronic device is to act as an upstream facing port or a downstream facing port and in response to a determination that the USB port of the electronic device is to be configured as an upstream facing port, to implement a port mapping process to map the USB port to one of a device controller or a debug controller.

In Example 9, the subject matter of Example 8 can optionally include logic further configured to map the USB port of the electronic device to a host controller in response to a determination that the USB port of the electronic device is to be configured as a downstream facing port.

In Example 10, the subject matter of any one of Examples 8-9 can optionally include logic further configured to communicate a configuration status of the USB port of the electronic device to a controller of the USB subsystem.

In Example 11, the subject matter of any one of Examples 8-10 can optionally include logic further configured to determine whether a USB debug feature is enabled for the electronic device and in response to a determination that the USB debug controller is enabled and available, to assign the USB port to the USB debug controller.

In Example 12, the subject matter of any one of Examples 8-11 can optionally include logic further configured to query at least one parameter from a basic input/output system (BIOS) for the electronic device.

In Example 13, the subject matter of any one of Examples 8-12 can optionally include logic further configured to determine whether a USB debug feature is enabled for the electronic device and in response to a determination that the USB debug controller is not enabled and available, to determine whether a USB device function is available and in response to a determination that a USB device function is available, to assign the USB port to the USB device controller.

In Example 14, the subject matter of any one of Examples 8-13 can optionally include logic further configured to generate an error in response to a determination that a USB device function is not available.

Example 15 is an apparatus, comprising logic, at least partially including hardware logic, to detect a connection from a first electronic device to a USB port of a second electronic device, determine whether the USB port of the second electronic device is to act as an upstream facing port or a downstream facing port and in response to a determination that the USB port of the second electronic device is to be configured as an upstream facing port, to implement a port mapping process to map the USB port to one of a device controller or a debug controller.

In Example 16, the subject matter of Example 15 can optionally include logic further configured to map the USB port of the electronic device to a host controller in response to a determination that the USB port of the electronic device is to be configured as a downstream facing port.

In Example 17, the subject matter of any one of Examples 15-16 can optionally include logic further configured to communicate a configuration status of the USB port of the electronic device to a controller of the USB subsystem.

In Example 18, the subject matter of any one of Examples 15-17 can optionally include logic further configured to determine whether a USB debug feature is enabled for the electronic device and in response to a determination that the USB debug controller is enabled and available, to assign the USB port to the USB debug controller.

In Example 19, the subject matter of any one of Examples 15-18 can optionally include logic further configured to query at least one parameter from a basic input/output system (BIOS) for the electronic device.

In Example 20, the subject matter of any one of Examples 15-10 can optionally include logic further configured to determine whether a USB debug feature is enabled for the electronic device and in response to a determination that the USB debug controller is not enabled and available, to determine whether a USB device function is available and in response to a determination that a USB device function is available, to assign the USB port to the USB device controller.

In Example 21, the subject matter of any one of Examples 15-20 can optionally include logic further configured to generate an error in response to a determination that a USB device function is not available.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An electronic device, comprising:
   a processor; and
   at least one universal serial bus (USB) subsystem comprising processing circuitry to:
      detect a power delivery connection from a remote electronic device to a USB port of the electronic device;
      determine whether the USB port of the electronic device is to act as an upstream facing port or a downstream facing port by initiating a handshake process with a USB controller on the electronic device to exchange capability information with the USB controller on the electronic device by exchanging one or more link management packet (LMP) configuration messages; and
      in response to a determination that the USB port of the electronic device is to be configured as an upstream facing port, to implement a port mapping process to map the USB port to one of a device controller or a debug controller, separate from the device controller.

2. The electronic device of claim 1, further comprising processing circuitry to:
   map the USB port of the electronic device to a host controller in response to a determination that the USB port of the electronic device is to be configured as a downstream facing port.

3. The electronic device of claim 1, further comprising processing circuitry to:
   communicate a configuration status of the USB port of the electronic device to a controller of the USB subsystem.

4. The electronic device of claim 1, further comprising processing circuitry to:
   determine whether a USB debug feature is enabled for the electronic device; and
   in response to a determination that the USB debug controller is enabled and available, to assign the USB port to the USB debug controller.

5. The electronic device of claim 4, further comprising processing circuitry to query at least one parameter from a basic input/output system (BIOS) for the electronic device.

6. The electronic device of claim 1, further comprising processing circuitry to:
   determine whether a USB debug feature is enabled for the electronic device; and
   in response to a determination that the USB debug controller is not enabled and available, to:
      determine whether a USB device function is available; and
      in response to a determination that a USB device function is available, to assign the USB port to the USB device controller.

7. The electronic device of claim 1, further comprising processing circuitry to:
   generate an error in response to a determination that a USB device function is not available.

8. A universal serial bus (USB) subsystem for use with an electronic device, the subsystem comprising:
   at least one USB port; and
   processing circuitry to:
      detect a power delivery connection from a remote electronic device to a USB port of the electronic device;
      determine whether the USB port of the electronic device is to act as an upstream facing port or a downstream facing port by initiating a handshake process with a USB controller on the electronic device to exchange capability information with the USB controller on the electronic device by exchanging one or more link management packet (LMP) configuration messages; and
      in response to a determination that the USB port of the electronic device is to be configured as an upstream facing port, to implement a port mapping process to map the USB port to one of a device controller or a debug controller, separate from the device controller.

9. The universal serial bus (USB) subsystem of claim 8, further comprising processing circuitry to:

map the USB port of the electronic device to a host controller in response to a determination that the USB port of the electronic device is to be configured as a downstream facing port.

10. The universal serial bus (USB) subsystem of claim 8, further comprising processing circuitry to:
communicate a configuration status of the USB port of the electronic device to a controller of the USB subsystem.

11. The universal serial bus (USB) subsystem of claim 8, further comprising processing circuitry to:
determine whether a USB debug feature is enabled for the electronic device; and
in response to a determination that the USB debug controller is enabled and available, to assign the USB port to the USB debug controller.

12. The universal serial bus (USB) subsystem of claim 11, further comprising processing circuitry to query at least one parameter from a basic input/output system (BIOS) for the electronic device.

13. The universal serial bus (USB) subsystem of claim 8, further comprising processing circuitry to:
determine whether a USB debug feature is enabled for the electronic device; and
in response to a determination that the USB debug controller is not enabled and available, to:
determine whether a USB device function is available; and
in response to a determination that a USB device function is available, to assign the USB port to the USB device controller.

14. The universal serial bus (USB) subsystem of claim 8, wherein the controller further executes logic to:
generate an error in response to a determination that a USB device function is not available.

15. An apparatus, comprising processing circuitry to:
detect a power delivery connection from a remote electronic device to a USB port of the electronic device;
determine whether the USB port of the electronic device is to act as an upstream facing port or a downstream facing port by initiating a handshake process with a USB controller on the electronic device to exchange capability information with the USB controller on the electronic device by exchanging one or more link management packet (LMP) configuration messages; and
in response to a determination that the USB port of the electronic device is to be configured as an upstream facing port, to implement a port mapping process to map the USB port to one of a device controller or a debug controller, separate from the device controller.

16. The apparatus of claim 15, further comprising processing circuitry to:
map the USB port of the electronic device to a host controller in response to a determination that the USB port of the electronic device is to be configured as a downstream facing port.

17. The apparatus of claim 15, wherein the controller further executes logic to:
communicate a configuration status of the USB port of the electronic device to a controller of the USB subsystem.

18. The apparatus of claim 15, further comprising processing circuitry to:
determine whether a USB debug feature is enabled for the electronic device; and
in response to a determination that the USB debug controller is enabled and available, to assign the USB port to the USB debug controller.

19. The apparatus of claim 18, further comprising processing circuitry to query at least one parameter from a basic input/output system (BIOS) for the electronic device.

20. The apparatus of claim 15, further comprising processing circuitry to:
determine whether a USB debug feature is enabled for the electronic device; and
in response to a determination that the USB debug controller is not enabled and available, to:
determine whether a USB device function is available; and
in response to a determination that a USB device function is available, to assign the USB port to the USB device controller.

21. The apparatus of claim 15, further comprising processing circuitry to:
generate an error in response to a determination that a USB device function is not available.

* * * * *